(12) United States Patent
Valentine et al.

(10) Patent No.: US 6,928,059 B1
(45) Date of Patent: Aug. 9, 2005

(54) EFFICIENT METHOD OF DEDUCING NETWORK TOPOLOGY INCLUDING ENDSTATIONS

(75) Inventors: Simon Peter Valentine, Hemel Hempstead (GB); Christopher Robert Linzell, St Albans (GB); Lee Anthony Walker, Watford (GB)

(73) Assignee: 3Com Corporation, Santa Clara, CA (US)

( * ) Notice: Subject to any disclaimer, the term of this patent is extended or adjusted under 35 U.S.C. 154(b) by 731 days.

(21) Appl. No.: 09/662,533

(22) Filed: Sep. 15, 2000

(30) Foreign Application Priority Data

Apr. 12, 2000 (GB) .............................................. 0009045

(51) Int. Cl.⁷ .............................................. H04L 12/28
(52) U.S. Cl. ........................ 370/255; 370/392; 370/401
(58) Field of Search ............................... 370/254, 255, 370/256, 257, 258, 389, 392, 401

(56) References Cited

U.S. PATENT DOCUMENTS

| | | | | |
|---|---|---|---|---|
| 5,319,644 A | * | 6/1994 | Liang ........................... | 370/452 |
| 5,321,695 A | * | 6/1994 | Faulk, Jr. ..................... | 370/401 |
| 5,590,201 A | * | 12/1996 | Lo ............................... | 370/257 |
| 5,734,824 A | * | 3/1998 | Choi ........................... | 709/224 |
| 5,796,736 A | | 8/1998 | Suzuki ......................... | 370/399 |
| 6,516,345 B1 | * | 2/2003 | Kracht ......................... | 709/220 |
| 6,587,440 B1 | * | 7/2003 | Dawes ......................... | 370/255 |
| 6,614,764 B1 | * | 9/2003 | Rodeheffer et al. .......... | 370/254 |

* cited by examiner

Primary Examiner—Chau Nguyen
Assistant Examiner—Christine Ng
(74) Attorney, Agent, or Firm—Michaelson & Associates; Peter L. Michaelson

(57) ABSTRACT

A technique for discovering the topology of a computer network and which relies on initially resolving the positions of end stations on the network and subsequently resolving the topology of remaining devices. This technique specifically involves querying a port of a managed device for a first address of any packet which it received; querying the same port for a second address of any other packet which the device received; if there is no such second packet, then returning data to a manager and determining if there is another port on the device; if there is such a second address, determining if there is another port on the device; repeating the preceding steps for the other port of the device; and if no such other port exists, repeating all the preceding steps for another managed device on the network.

4 Claims, 2 Drawing Sheets

| Port | Learnt Addreses |
|---|---|
| A1 | B, X, Y, Z |
| A2 | D, R, S, T |
| A3 | C, U, V, W |
| B1 | Z |
| B2 | A, C, D, R, S, T, U, V, W |
| B3 | Y |
| B4 | Z |
| C1 | A, B, D, R, S, T, X, Y, Z |
| C2 | U |
| C3 | V |
| C4 | W |
| D1 | A, B, C, U, V, W, X, Y, Z |
| D2 | R |
| D3 | S |
| D4 | T |

EFFICIENT METHOD OF DEDUCING NETWORK TOPOLOGY INCLUDING ENDSTATIONS

BACKGROUND OF THE INVENTION

The present invention relates to a method and apparatus for deducing network topology.

The present invention relates to the process of discovery of the devices on a network, that is a network of electronic devices comprising, for example, workstations, personal computers, servers, hubs, routers, bridges, switches, (hereinafter referred to as devices of the network), and links between these devices which may be in the form of physical cable or wireless links. The network may be a local area network (LAN), such as an Ethernet network, wide area network (WAN) or other types, including wireless networks.

Computers and other devices connected to a network may be managed or unmanaged devices. A managed device has processing capability, which enables it to monitor data traffic sent from, received at, and passing through the ports of the device. Monitored data associated with the ports of the network device is stored in memory on the network device. For example, data relating to the origin of a data packet which is received at a port is stored along with the identity of the relevant port.

After such a network has been installed, it is desirable for the person appointed network manager to be able to understand the technical operation of the network. In known network management systems, the manner in which the relevant data is retrieved from the managed devices, compiled and displayed ("discovered") has been problematic in several respects.

The topology of the network may be deduced by the network manager's computer by the process of discovery in which each of the devices of the network is interrogated to thereby produce on a network manager's workstation details of the network and its operation, preferably in the form of a network map which may be displayed on a visual display unit showing the devices and links between the devices. At its simplest, and where the device is a "managed" device, this information is usually provided by interrogation using a known protocol, such as the SNMP (Simple Network Management Protocol), of the so-called 'agent' of each device which stores the device's unique MAC address, the type of device and the MAC addresses embedded in the data passing into a particular port which thereby gives the MAC addresses of the origin of the data and hence the MAC address of the devices which are connected to the ports directly or indirectly.

One particular problem is that in any but the simplest of networks, the discovery procedure can be very slow in view of the large number of interrogations required.

It would be desirable to reduce the number of interrogations required to speed up the discovery process.

SUMMARY OF THE INVENTION

The present invention provides a method for discovering the topology of a network comprising:
    initially resolving the positions of the end stations, and subsequently resolving the topology of the remaining devices.

The present invention also provides a computer program on a computer readable medium loadable into a digital computer or embodied in a carrier wave, said program including software for carrying out the method of the preceding paragraph.

The present invention also provides a computer program on a computer readable medium loadable into a digital computer or embodied in a carrier wave, for discovering the topology of a network comprising:
    a program step to query a port of a managed device for a first address of any packet which has been received;
    a program step for querying the same port of the device for a second address of any packet which has been received;
    if there is no second address, returning relevant data to a manager and determining if there is another port on the device;
    if there is a second address, determining if there is another port on the device;
    if there is another port on the device, repeating the preceding four steps for another port of the managed device,
    if not, repeating the preceding five steps in respect of another managed device.

BRIEF DESCRIPTION OF THE DRAWINGS

A preferred embodiment of the invention will now be described by way of example only and with reference to the accompanying drawings in which.

DESCRIPTION OF THE PREFERRED EMBODIMENTS

The physical network to be discovered may comprise a plurality of devices in the form of a network supervisor's workstation or computer, other workstations, hubs, or switches.

The devices are connected together by means of links which may be hard wired or wireless and utilise any desired protocol.

The network supervisor's workstation includes, in addition to a visual display unit, a central processing unit or signal processor, a selector which may be in the form of a mouse, a program store which may comprise, for example, a CD drive, a floppy disk drive or a zip drive, and a memory for storing a program which may have been loaded from the program store or downloaded for example via Internet from a website.

To discover the network, using SNMP, the network supervisor's computer interrogates each device and analyses the network, and stores in the memory the information relating to the devices within the network and the links between the devices. In essence, managed devices include a so-called agent which in the case of an SNMP agent stores information about the device such as its unique MAC address, its sysObject ID (which identifies what the device is and its model type), how many ports it has, and the MAC address of the origin of the data which at least some of the ports have received and hence to which they are directly or indirectly connected. The computer interrogates the agents of each device.

In a preferred arrangement, the computer may, on command from the selector, process signals from the memory by the signal processor and provide on the visual display unit a network map showing each of the devices and the links therebetween. In the examples described, the network is simple but of course in many instances the network will be considerably more complex and it may be necessary to arrange that the visual display unit only shows a simplified version or only part of the network at any one time.

Figures 1, 2:
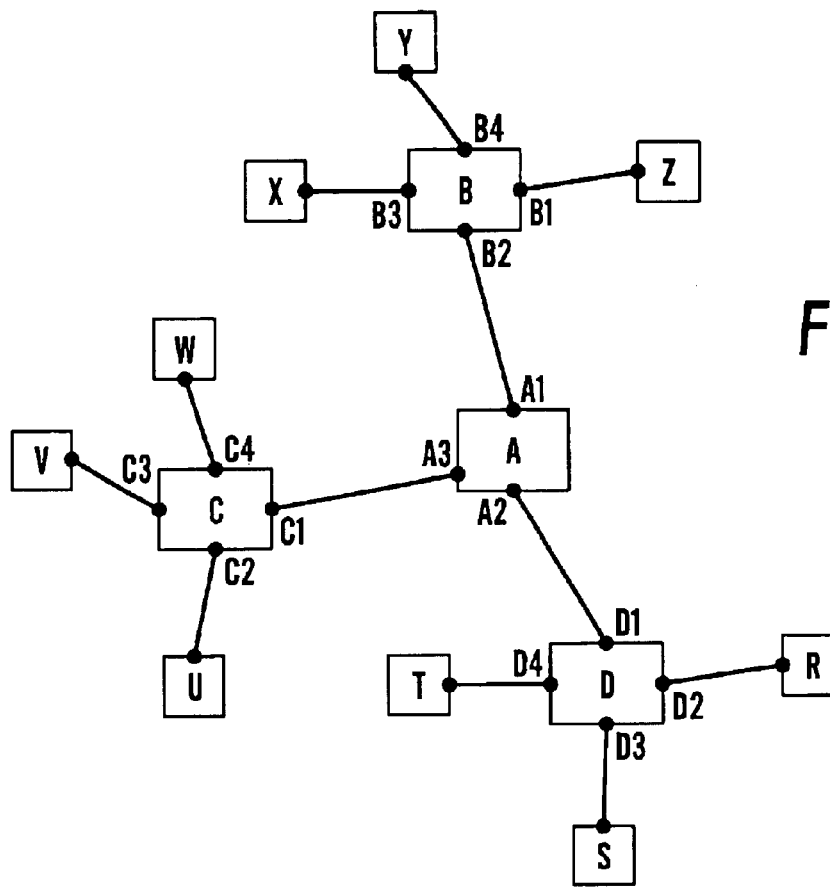
FIG. 1 shows a network to be discovered.
FIG. 2 is a table of learnt addresses for each port.
Figure 3:
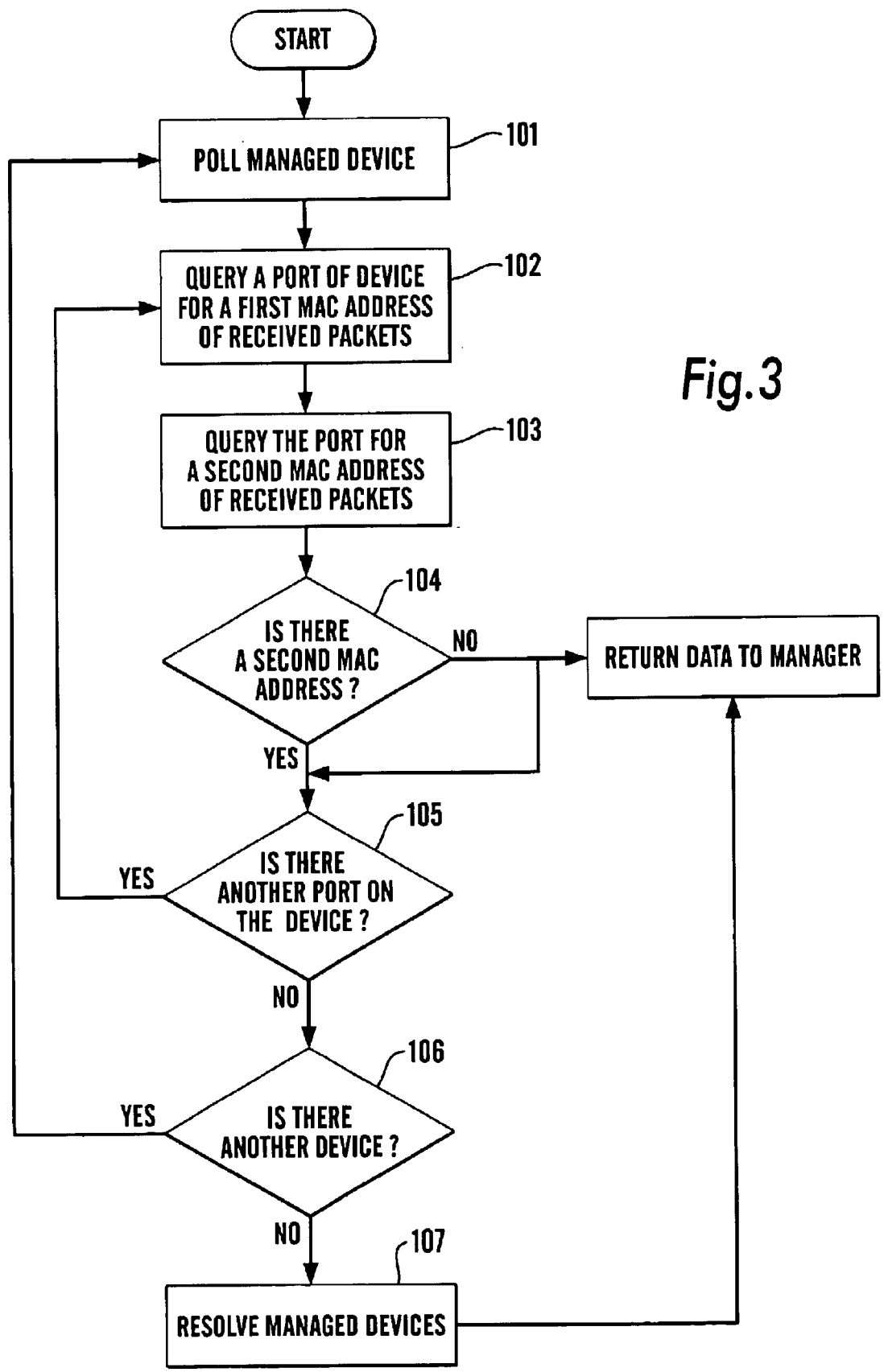
FIG. 3 is a flow chart of a program for carrying out the preferred method of the invention.

FIG. 1 shows an example of a simple network topology. The managed devices which may be switches and hubs are represented by the rectangles labelled A–D. Each device has three or four ports labelled, for example, A1, A2, A3, B1, B2, B3, B4. End stations, that is devices which have only a single connection to the network and are typically Personal Computers or workstations, are represented by squares R–Z. As is well known the ports of a managed device will learn the source MAC addresses of any packets of data that pass through them from another device. Referring to FIG. 2, there is set out a table listing each of the ports of FIG. 1, and the addresses learnt by each port and which is stored on the relevant agent. Thus port A1 will learn all of the addresses of device B and the devices to which it is attached and will thus learn the MAC address of B, X Y, Z. Note that to simplify the explanation, the table assumes that any packet transmitted by a device is seen by all nodes downstream of it. In a switched network this may not necessarily be the case.

In order to determine the topology of the network, as already explained, the network manager's computer queries each managed node to determine the addresses of other nodes on the network to which it has been connected. This would include the address of all other managed nodes and the end stations. This type of request normally involves interrogating all of the end stations (one request per address) or interrogating each address (again potentially one request per address). This data can then be used to determine the relative locations of all of the nodes on the network.

In order to reduce the number of interrogations or requests, we arrange for the position of the end stations to be resolved before attempting to deduce the relative positions of the managed devices. This can be done by querying each managed device to return details of any ports that have only learnt one address and to return that address. Thus in the example of FIG. 1, such ports would be B1, B3, B4, C2, C3, C4, D2, D3, and D4 (ie those ports are connected to end stations). In order to obtain this information, two requests per port are made, one to obtain the first address, and another to determine if there is a second address. In the example given, this means that for each of B, C and D, eight requests (two times the number of ports) are made per device in order to determine the attached end stations. This request procedure replaces in the prior art the one request per end station (a total of nine).

In a real network there is likely to be significantly more end stations than managed devices and ports on a device. For example, in a network of twenty managed devices and four hundred end stations, where each device has approximately 20 ports in use, to resolve the end stations for each managed device would require about forty requests rather than a total of four hundred requests to cover all of the end stations using the prior procedure.

Having resolved the end stations, the discovery of the remaining managed devices can proceed. Thus it is only necessary to discover the relative positions of the managed devices. To do this only requires a small number of requests per device. For example, for device A, the query "which ports have learnt the addresses of device B, C or D?" would be made which would require only three requests (ie the topology of the end station is already known).

The preferred method of the invention is carried out under the control of the network manager's workstation or computer and in particular by means of a program controlling the processor apparatus of that computer or elsewhere in the system.

The program for controlling the operation of the invention may be provided on a computer readable medium, such as a CD, or a floppy disk, or a zip drive disk carrying the program or their equivalent, or may be provided on a computer or computer memory carrying the website of, for example, the supplier of the network products. The program may be downloaded from whichever appropriate source and used to control the processor to carry out the steps of the invention as described.

The program may include an algorithm of the form set out in the flow chart (FIG. 2) of the drawings.

Thus the program may include the following steps:
program step 101, network manager's computer polls a managed device;
program step 102, query a port of the device for a first MAC address of any packet which has been received;
program step 103, query the same port of the device for a second MAC address of any packet which has been received;
if there is not a second MAC address, (ie the first MAC address is an end station) in program step 104, return relevant data to manager and go to step 105;
if there is a second MAC address, go to step 105;
in step 105, is there another port on the device?;
if yes, go to program step 102;
if no, go to program step 106;
in program step 106, is there another device?;
if there is another device, go to program step 101;
if there is not another device, go to step 107;
in program step 107, resolve the managed devices.

The invention is not restricted to the details of the foregoing example.

What is claimed is:

1. A method for discovering the topology of a network comprising the steps of:
    initially resolving positions of end stations on the network; and
    subsequently resolving the topology of remaining devices on the network;
    wherein said end stations positions resolving step comprises the steps of:
        determining, for a port of a managed device on the network, a first address of any packet which has been received by said port;
        determining, for said port, whether said packet contains a second address; and
        if said packet does not contain the second address, specifying that the port is connected to an end station.

2. A computer program on a computer readable medium loadable into a digital computer or embodied in a carrier wave, said program including software for carrying out the method of claim 1.

3. A computer program on a computer readable medium loadable into a digital computer or embodied in a carrier wave, for discovering the topology of a network comprising:
    a program step to query a port of a managed device for a first address of any packet which has been received;
    a program step for querying the same port of the device for a second address of any packet which has been received;

if there is no second address, returning relevant data to a manager and determining if there is another port on the device;

if there is a second address, determining if there is another port on the device;

if there is another port on the device, repeating the preceding four steps for another port of the managed device;

if not, repeating the preceding five steps in respect of another managed device.

4. A method for discovering the topology of a network, the method comprising the steps of:

(a) querying a port of a managed device on the network for a first address of any packet which has been received by the managed device;

(b) querying said port of the device for a second address of any packet which has been received by the managed device;

(c) if said second address does not exist, returning appropriate data to a manager and determining if there is another port on the managed device;

(d) if said second address exists, determining if there is said other port on the device;

(e) if said other port exists on the managed device, repeating steps (a)–(d) for said other port; and (f) if said other port does not exist on the managed device, repeating steps (a)–(e) for another managed device on the network.

* * * * *